US012173859B1

(12) United States Patent
Shih

(10) Patent No.: US 12,173,859 B1
(45) Date of Patent: Dec. 24, 2024

(54) VEHICLE LIGHT APPARATUS

(71) Applicant: T.Y.C. BROTHER INDUSTRIAL CO., LTD., Tainan (TW)

(72) Inventor: Ming-Chih Shih, Tainan (TW)

(73) Assignee: T.Y.C. Brother Industrial Co., Ltd., Tainan (TW)

( * ) Notice: Subject to any disclaimer, the term of this patent is extended or adjusted under 35 U.S.C. 154(b) by 0 days.

(21) Appl. No.: 18/665,119

(22) Filed: May 15, 2024

(51) Int. Cl.
*F21S 41/26* (2018.01)
*F21S 41/255* (2018.01)
*F21S 41/33* (2018.01)
*F21S 43/40* (2018.01)

(52) U.S. Cl.
CPC ............. *F21S 41/26* (2018.01); *F21S 41/255* (2018.01); *F21S 41/337* (2018.01); *F21S 43/40* (2018.01)

(58) Field of Classification Search
CPC ........ F21S 41/26; F21S 41/255; F21S 41/337; F21S 43/40
See application file for complete search history.

(56) References Cited

U.S. PATENT DOCUMENTS 8,591,083 B2 * 11/2013 Koizumi .................. F21V 5/04 362/520
11,572,998 B2 * 2/2023 Matsumoto ........... F21S 41/322
11,585,507 B2 * 2/2023 Zhang ...................... G02B 3/04
2006/0262525 A1 * 11/2006 Barbeau .................. F21S 6/001 362/157
2014/0321139 A1 * 10/2014 Bungenstock .......... F21S 41/10 362/511
2019/0234576 A1 * 8/2019 Mateju ..................... H05K 1/18
2019/0301705 A1 * 10/2019 Schickel ............ G02B 19/0028
2022/0055533 A1 * 2/2022 Cabana .................... B60Q 3/62
2022/0163179 A1 * 5/2022 Sato ........................ F21S 43/26
2022/0235917 A1 * 7/2022 Kojima ................... F21V 5/043
2023/0008568 A1 * 1/2023 Shah ....................... F21S 43/14
2023/0213777 A1 * 7/2023 Zhang ..................... F21S 41/27 362/459

* cited by examiner

*Primary Examiner* — Bryon T Gyllstrom
(74) *Attorney, Agent, or Firm* — Burris Law, PLLC

(57) ABSTRACT

A vehicle light apparatus includes a light-emitting member, a light-entering lens including juxtaposed incident structures, and a light-exiting lens. The incident structures are adapted for refracting or reflecting the light rays from the light-emitting member, such that extension lines of the light rays refracted or reflected by the incident structures intersect with a first focal region. The light-exiting lens extends from the light-entering lens, and includes a reflecting portion and a light-exiting portion opposite to the reflecting portion. The reflecting portion has spaced-apart reflecting surfaces adapted for reflecting the light rays refracted or reflected by the incident structures. Each reflecting surface serves as one of two curved surfaces of a hyperboloid, such that the extension lines of the light rays reflected by the reflecting surface intersect with a second focal region, and that the first focal region and the second focal region respectively overlap two focal points of the hyperboloid.

10 Claims, 6 Drawing Sheets

VEHICLE LIGHT APPARATUS

FIELD

The disclosure relates to a light apparatus, and more particularly to a vehicle light apparatus.

BACKGROUND

With development in the vehicle industry, the related industry rapidly grows to make original equipment manufacturer parts or aftermarket parts. For example, a vehicle light apparatus may be stimulated to provide a decorative function in combination with functions of a high/low beam headlight, a turn signal light, or a daytime running light. Therefore, it is a goal to develop a vehicle light apparatus that is different from an existing vehicle light apparatus.

SUMMARY

Therefore, an object of the disclosure is to provide a vehicle light apparatus that is different from the prior art.

According to the disclosure, the vehicle light apparatus includes a light-emitting member, a light-entering lens, and a light-exiting lens.

The light-entering lens includes a plurality of incident structures that are juxtaposed with each other in a front-rear direction, that are adapted for passage of light rays generated from the light-emitting member therethrough into the incident structures, and that are adapted for refracting or reflecting the light rays entering the incident structures, such that extension lines of the light rays refracted or reflected by the incident structures intersect with a first focal region.

The light-exiting lens extends downwardly from the light-entering lens in a top-bottom direction that is perpendicular to the front-rear direction. The light-exiting lens includes a reflecting portion and a light-exiting portion.

The reflecting portion has a plurality of reflecting surfaces substantially arranged in the top-bottom direction, spaced apart from each other, and adapted for reflecting the light rays that are refracted or reflected by the incident structures. Each of the reflecting surfaces serves as one of two curved surfaces of a hyperboloid, such that the extension lines of the light rays reflected by the reflecting surface intersect with a second focal region, and that the first focal region and the second focal region respectively overlap two focal points of the hyperboloid.

The light-exiting portion is opposite to the reflecting portion in the front-rear direction.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
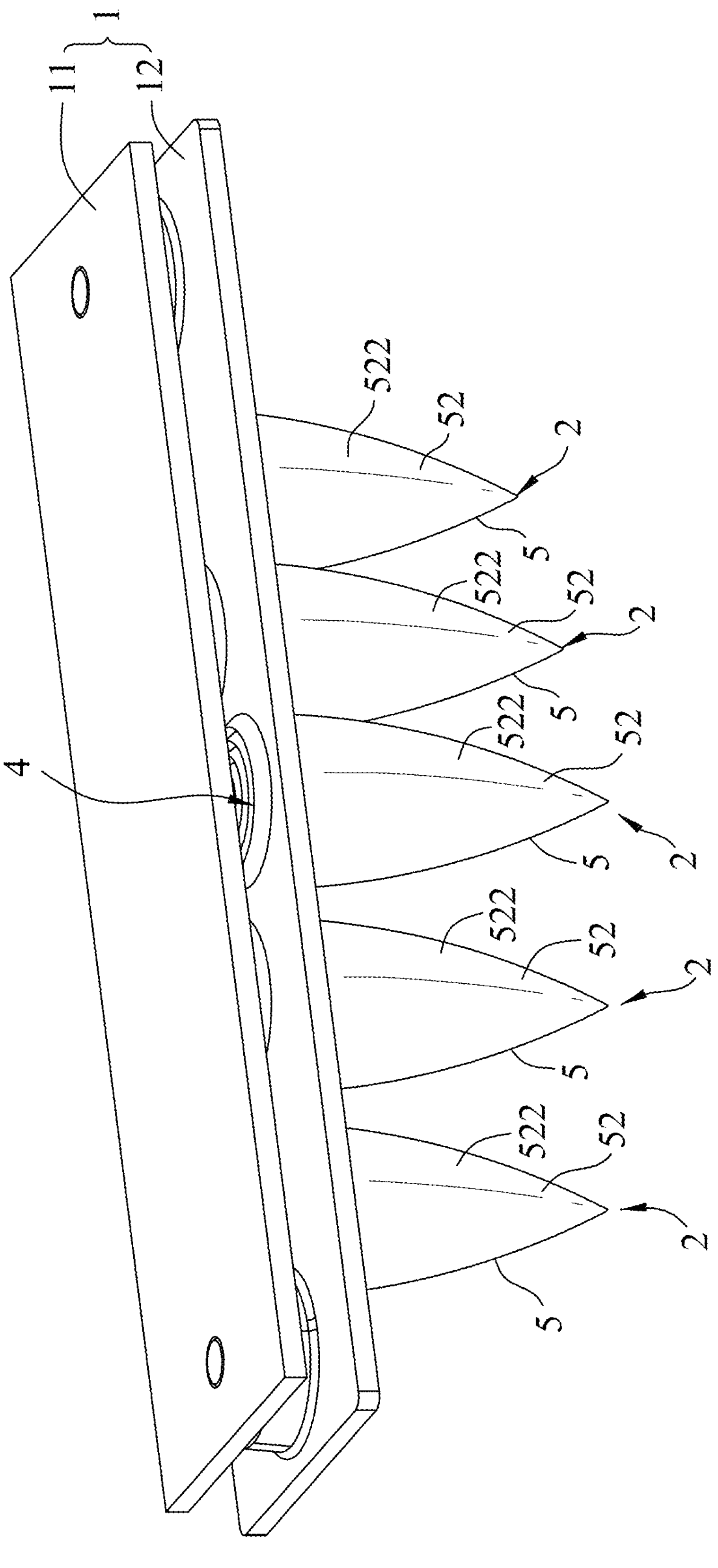
FIG. 1 is a perspective view illustrating an embodiment of a vehicle light apparatus according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
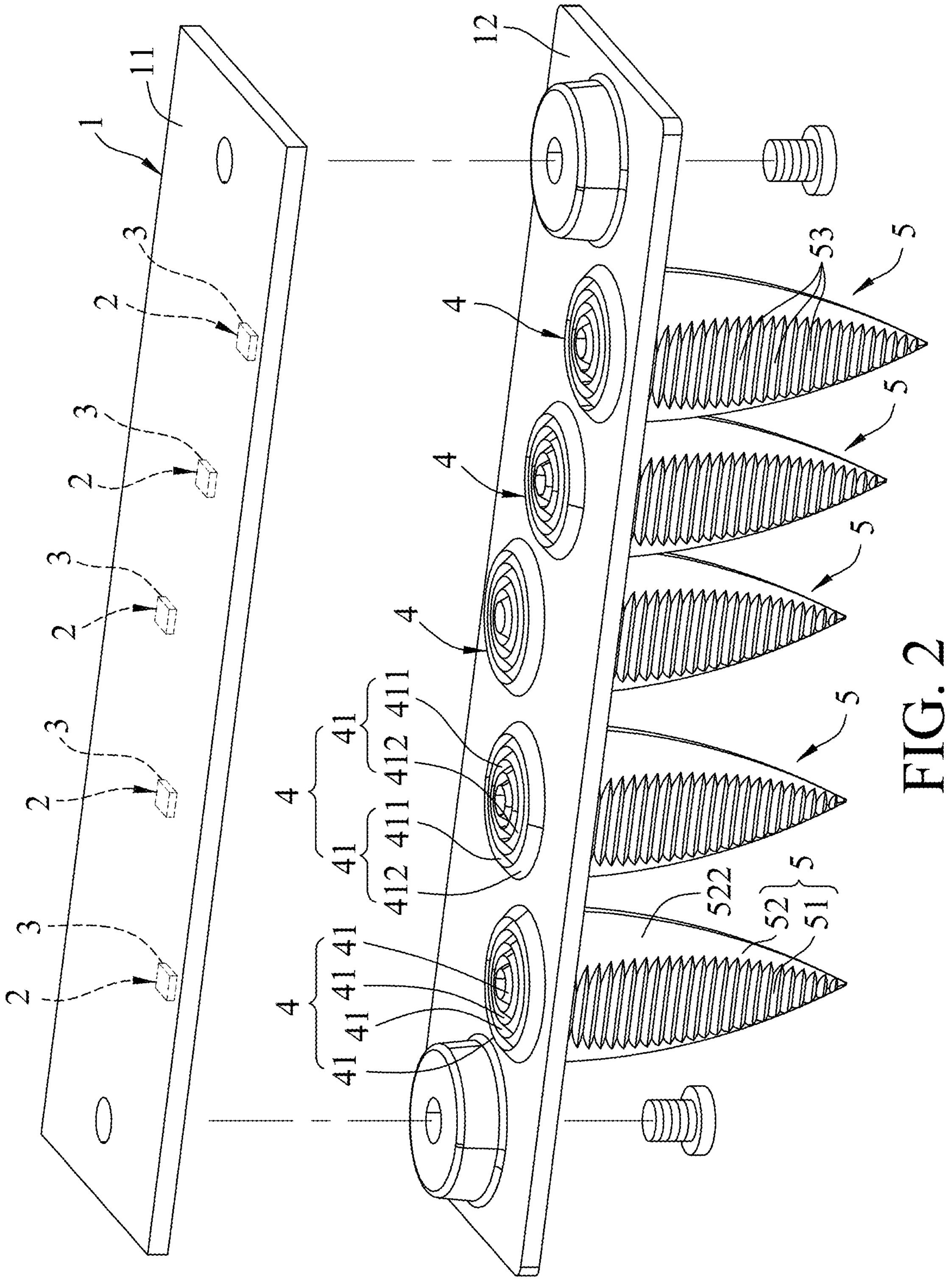
FIG. 2 is a partly exploded perspective view of the embodiment.
Figure 3:
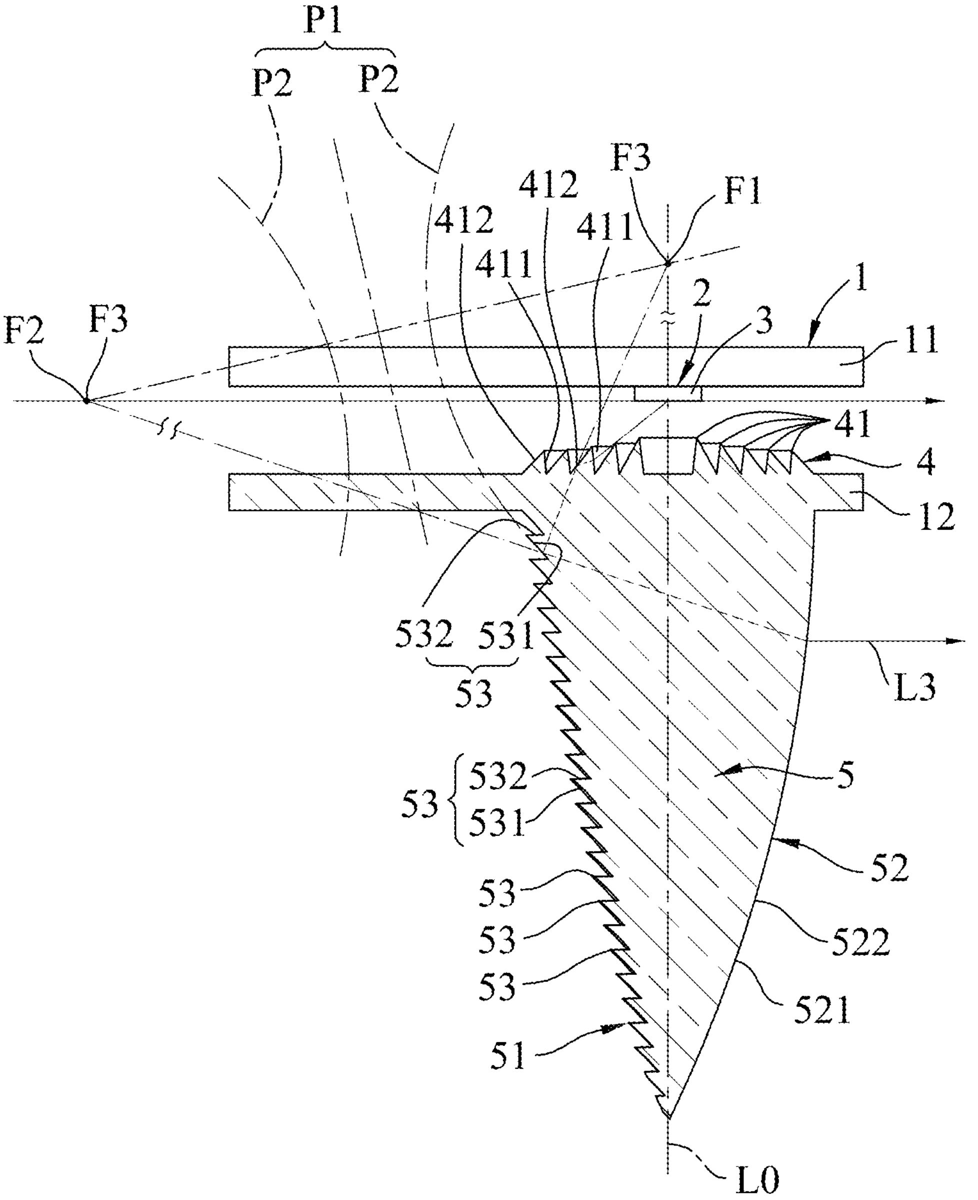
FIG. 3 is a schematic sectional side view of the embodiment illustrating one of reflecting surfaces of the vehicle light apparatus serving as one of two curved surfaces of a hyperboloid with two focal points.

Referring to FIGS. 1 to 3, an embodiment of a vehicle light apparatus according to the disclosure includes a support unit 1 and a plurality of spaced-apart optical units 2 connected to the support unit 1.

The support unit 1 includes a circuit board 11 and a support board 12 that are stacked on each other in a top-bottom direction. In this embodiment, the support board 12 is disposed below and fastened to the circuit board 11.

Each of the optical units 2 includes a light-emitting member 3 disposed on a bottom surface of the circuit board 11, a light-entering lens 4 integrally connected to the support board 12, and a light-exiting lens 5 extending integrally and downwardly from the light-entering lens 4 in the top-bottom direction.

Because the optical units 2 are identical in structure to each other, only one of the optical units 2 will be described hereinafter.

The light-emitting member 3 is a light-emitting diode chip.

The light-entering lens 4 includes a plurality of incident structures 41 that are juxtaposed with each other in a front-rear direction perpendicular to the top-bottom direction. In this embodiment, the incident structures 41 are ring structures and are arranged in layers such that an outer one of the incident structures 41 surrounds an inner one of the incident structures 41. Specifically, as shown in FIG. 3, the incident structures 41 are circular ring structures and are concentric about a central axis (L0) that extends in the top-bottom direction. Each of the incident structures 41 has an incident surface 411 that is disposed at an inner end of the incident structure 41, and a reflecting light surface 412 that is disposed at an outer end of the incident structure 41. The incident surface 411 and the reflecting light surface 412 of each of the incident structure 41 are circular.

Figure 5:
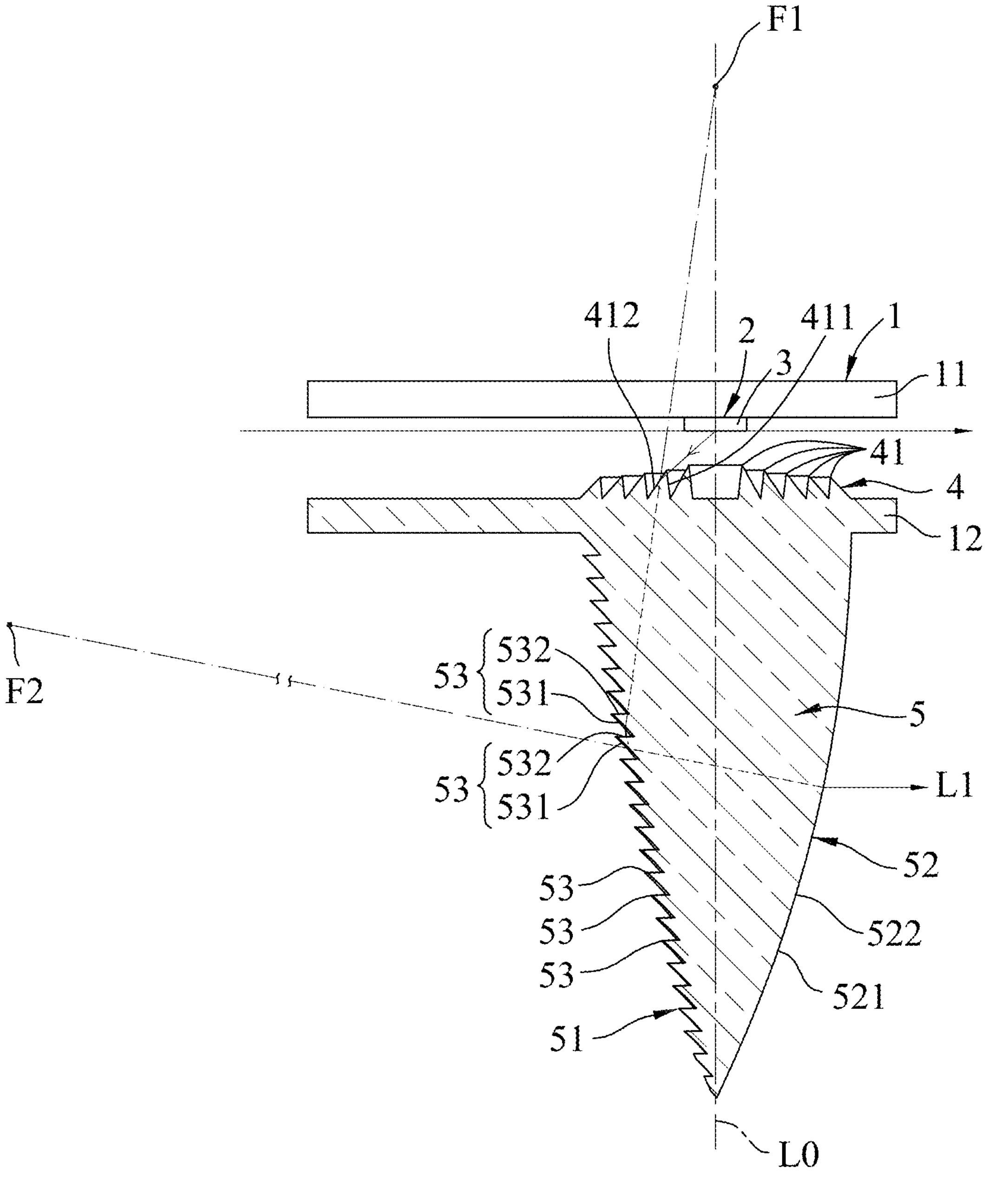
FIG. 5 is a view similar to FIG. 3, but illustrating a light trace different from the light trace that is shown in FIG. 3.
Figure 6:
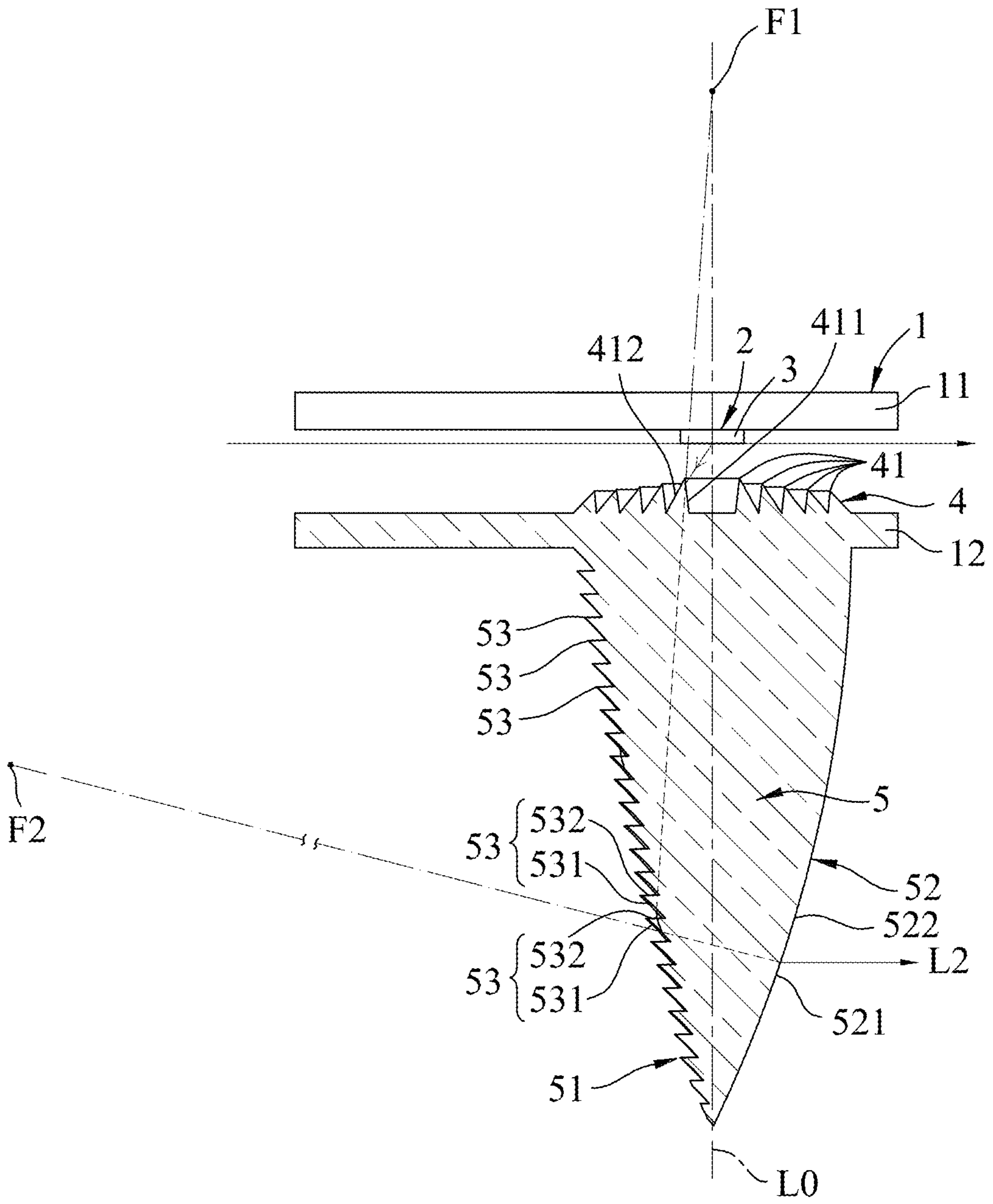
FIG. 6 is a view similar to FIG. 3, but illustrating a light trace different from the light trace that is shown in FIG. 3

The incident surface 411 of each of the incident structure 41 is adapted for passage and refraction of the light rays generated from the light-emitting member 3 therethrough into the incident structure 41. As shown in FIGS. 3, 5, and 6, a portion of the light rays entering the incident structures 41 are reflected by the reflecting light surfaces 412 of the incident structures 41. Extension lines of the portion of the light rays intersect with a first focal region (F1). Another portion of the light rays entering the incident structures 41 are refracted by the incident surfaces 411 of the incident structures 41 and are not reflected by the reflecting light surfaces 412 of the incident structures 41. Extension lines of the another portion of the light rays intersect with the first focal region (F1). That is to say, the incident structures 41 are adapted for passage of light rays generated from the light-emitting member 3 therethrough into the incident structures 41, and are adapted for refracting or reflecting the light rays entering the incident structures 41, such that extension lines of the light rays refracted or reflected by the incident structures 41 intersect with the first focal region (F1) as if the light rays are emitted from a virtual light source located in the first focal region (F1).

For each of the incident structures 41, top ends of the incident surface 411 and the reflecting light surface 412 cooperate to form a top end of the incident structure 41 in a sharp toothed shape.

Figure 4:
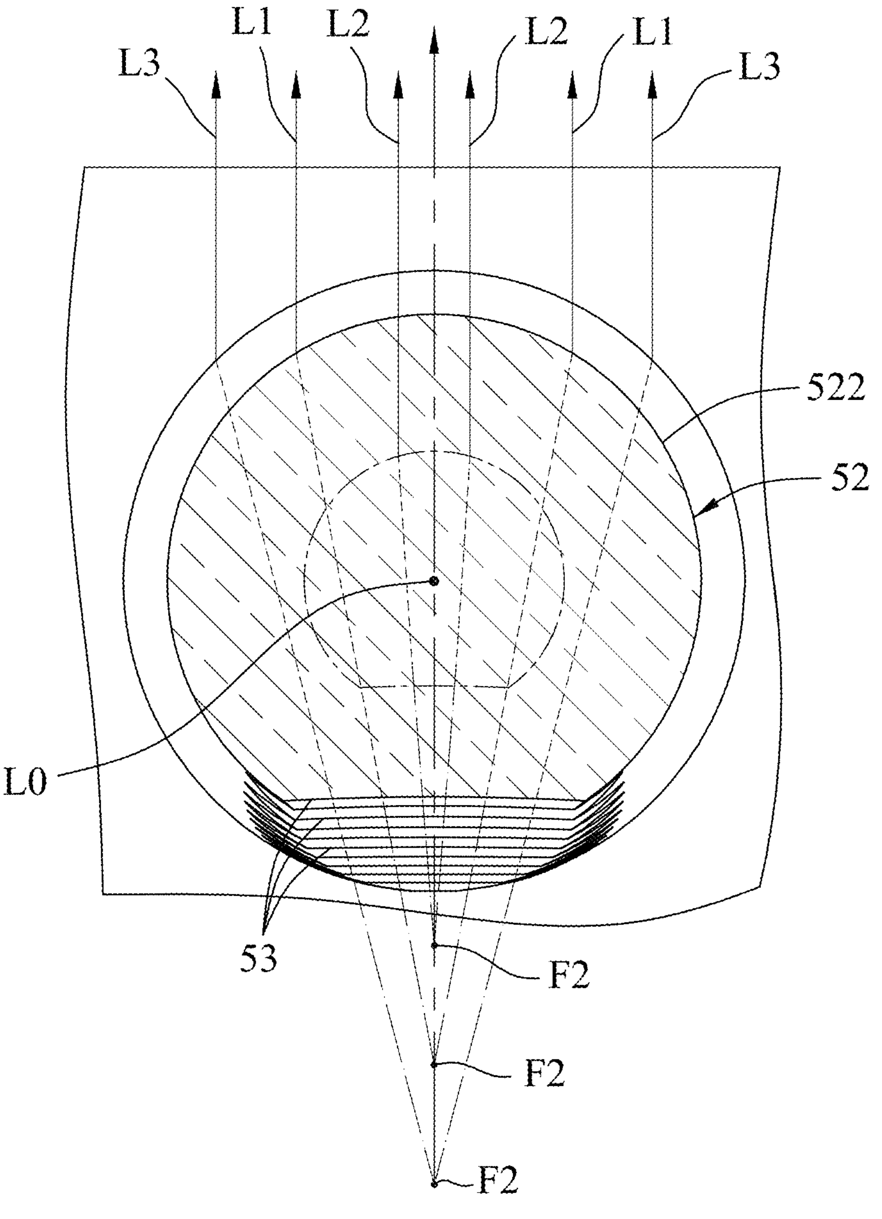
FIG. 4 is a schematic sectional top view of the embodiment illustrating different second focal regions related to different reflecting structures of the vehicle light apparatus.

As shown in FIGS. 2 to 4, the light-exiting lens 5 is icicle shaped, and includes a reflecting portion 51 and a light-exiting portion 52 opposite to the reflecting portion 51 in the front-rear direction.

As shown in FIG. 3, the reflecting portion 51 includes a plurality of reflecting structures 53 that are arranged along an inclined plane inclined forwardly in a manner where a lowest one of the reflecting structures 53 is disposed at a front side of a topmost one of the reflecting structures 53. The reflecting structures 53 cooperatively form a sawtooth configuration. Each of the reflecting structures 53 has a reflecting surface 531 and a connection surface 532, The reflecting surfaces 531 of the reflecting structures 53 are substantially arranged in the top-bottom direction and are spaced apart from each other. Each of the reflecting surfaces 531 has a top end and a bottom end that is below the top end, and is inclined forwardly from the top end to the bottom end. The reflecting surfaces 531 of the reflecting structures 53 are adapted for reflecting the light rays that are refracted or reflected by the incident structures 41. As shown in FIGS. 3, 5 and 6, each of the reflecting surfaces 531 serves as one of two curved surfaces (P2, P2) of a hyperboloid (P1), such that extension lines of the light rays reflected by the reflecting surface 531 intersect with a second focal region (F2), and that the first focal region (F1) and the second focal region (F2) respectively overlap two focal points (F3) of the hyperboloid (P1).

For each of the reflecting structures 53, the connection surface 532 is connected to the reflecting surface 531 of the reflecting structure 53 and the reflecting surface 531 of an adjacent one of the reflecting structures 53. The connection surface 532 of each of the reflecting structures 53 extends horizontally.

As shown in FIGS. 3 to 6, extension lines of the light rays reflected by different reflecting surfaces 531 intersect with different second focal regions (F2). Specifically, the higher the reflecting surface 531 is, the farther the corresponding second focal region (F2) is distal from the central axis (L0). In FIGS. 3, 5 and 6, the light rays exiting the light-exiting lens 5 at different height locations are respectively depicted as a first light beam (L1), a second light beam (L2), and a third light beam (L3), and are projected onto a same plane as shown in FIG. 4.

Noticeably, the lower the reflecting surface 531 is, the closer the corresponding second focal region (F2) is relative to the central axis (L0).

In this embodiment, as shown in FIG. 3, the third light beam (L3) is formed by the light rays that are reflected by the reflecting surface 531 at a location relatively high and that exit the light-exiting lens 5 at a location relatively high. As shown in FIG. 4, the second focal region (F2) intersected by the extension lines of the third light beam (L3) is relatively distal from the central axis (L0).

As shown in FIG. 6, the second light beam (L2) is formed by the light rays that are reflected by the reflecting surface 531 at a location relatively low and that exit the light-exiting lens 5 at a location relatively low. As shown in FIG. 4, the second focal region (F2) intersected by the extension lines of the second light beam (L2) is relatively close to the central axis (L0).

As shown in FIG. 5, the first light beam (L1) is formed by the light rays that are reflected by the reflecting surface 531, which is disposed between the reflecting surface 531 reflecting the light rays forming the second light beam (L2) and the reflecting surface 531 reflecting the light rays forming the third light beam (L3). As shown in FIG. 4, the second focal region (F2) intersected by the extension lines of the first light beam (L1) is disposed between the second focal region (F2) intersected by the extension lines of the second light beam (L2) and the second focal region (F2) intersected by the extension lines of the third light beam (L3).

Referring back to FIGS. 1 to 3, the light-exiting portion 52 of the light-exiting lens 5 has a light-exiting surface 522 that intersects with a section plane overlapping the central axis (L0) and extending in the front-rear direction along an extension curve 521. As shown in FIG. 3, the extension curve 521 extends curvedly and rearwardly from a top end to a bottom end thereof. In this embodiment, the light-exiting surface 522 is a continuous or smooth curved surface, and is connected to the reflecting structures 53.

In use, as shown in FIGS. 3 and 5, a part of light rays from the light-emitting member 3 enter the incident structures 41 and are reflected by the reflecting light surfaces 412 of the incident structures 41 to the reflecting surfaces 531 of the reflecting structures 53. Extension lines of light traces of these light rays reflected by the reflecting light surfaces 412 of the incident structures 41 and reflected by the reflecting surfaces 531 of the reflecting structures 53 pass through the first focal region (F1). These light rays, which are reflected by the reflecting light surfaces 412 of the incident structures 41 and reflected by the reflecting surfaces 531 of the reflecting structures 53, exit from the light-exiting surface 522.

As shown in FIG. 5, when the light rays reflected by the reflecting light surface 412 travel to one of the reflecting surfaces 531 of the reflecting structures 53 at an angle that is not satisfied to be a total reflection angle, they pass through the one of the reflecting surfaces 531 of the reflecting structures 53 and enter the connection surface 532 of a next one of the reflecting structures 53, thereby being reflected by the reflecting surface 531 of the next one of the reflecting structures 53.

As shown in FIG. 6, when the light rays from the light-emitting member 3 are incident on the innermost incident structure 41, due to an angle of incidence, they are not reflected by the reflecting light surface 412 of the innermost incident structure 41, but are refracted by the incident surface 411 of the innermost incident structure 41 to travel toward the reflecting structures 53. The light rays incident on the innermost incident structure 41, as shown in FIG. 6, may pass through a corresponding reflecting surface 531 of one of the reflecting structures 53 and enter the connection surface 532 of a next one of the reflecting structures 53, thereby being reflected by the reflecting surface 531 of the next one of the reflecting structures 53.

An optical principle of a hyperboloid (P1) is that after a light ray is emitted from a focal point (F3) of one of two curve surfaces (P2, P2) of the hyperboloid (P1) and is reflected by the other one of the two curve surfaces (P2, P2), an extension line of the light ray passes through the focal point (F3) of the other one of the two curve surfaces (P2, P2). Because the extension lines of the light rays reflected by the reflecting light surface 412 of each incident structure 41 pass through the first focal region (F1) as the light rays are emitted from one of the focal points (F3) of one of two curved surfaces (P2, P2) of a corresponding hyperboloid (P1), and because the other one of the two curved surfaces (P2, P2) of the corresponding hyperboloid (P1) is served by a corresponding one of the reflecting surfaces 531, the extension lines of the light rays reflected by each of the reflecting surface 531 pass through the focal point (F3) of the other one of the two curved surfaces (P2, P2) of the corresponding hyperboloid (P1) and the second focal region (F2) overlapping the focal point (F3).

In summary, the vehicle light apparatus of the disclosure are advantageous in that structure, shape, and optical design principles of the vehicle light apparatus of the disclosure are different from the existing vehicle light apparatus.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle light apparatus, comprising:

a light-emitting member;

a light-entering lens including a plurality of incident structures that are juxtaposed with each other in a front-rear direction, that are adapted for passage of light rays generated from said light-emitting member therethrough into said incident structures, and that are adapted for refracting or reflecting the light rays entering said incident structures, such that extension lines of the light rays refracted or reflected by said incident structures intersect with a first focal region; and a light-exiting lens extending downwardly from said light-entering lens in a top-bottom direction that is perpendicular to the front-rear direction, said light-exiting lens including a reflecting portion that has a plurality of reflecting surfaces substantially arranged in the top-bottom direction, spaced apart from each other, and adapted for reflecting the light rays that are refracted or reflected by said incident structures, each of said reflecting surfaces serving as one of two curved surfaces of a hyperboloid, such that the extension lines of the light rays reflected by said reflecting surface intersect with a second focal region, and that the first focal region and the second focal region respectively overlap two focal points of the hyperboloid, and a light-exiting portion that is opposite to said reflecting portion in the front-rear direction.

2. The vehicle light apparatus as claimed in claim 1, wherein:

said reflecting portion includes a plurality of reflecting structures that respectively have said reflecting surfaces;

each of said reflecting surfaces has a top end and a bottom end that is below said top end, and is inclined forwardly from said top end to said bottom end;

each of said reflecting structures further has a connection surface that is connected to said reflecting surface of said reflecting structure and said reflecting surface of an adjacent one of said reflecting structures; and said reflecting structures cooperatively form a sawtooth configuration.

3. The vehicle light apparatus as claimed in claim 2, wherein said reflecting structures are arranged along an inclined plane that is inclined forwardly in a manner where a lowest one of said reflecting structures is disposed at a front side of a topmost one of said reflecting structures.

4. The vehicle light apparatus as claimed in claim 3, wherein said connection surface of each of said reflecting structures extends horizontally.

5. The vehicle light apparatus as claimed in claim 1, wherein:

said incident structures are ring structures and are arranged in layers such that an outer one of said incident structures surrounds an inner one of said incident structures;

each of said incident structures has an incident surface that is disposed at an inner end of said incident structure and that is adapted for the passage of the light rays generated from said light-emitting member therethrough into said incident structure, and a reflecting light surface that is disposed at an outer end of said incident structure; and a portion of the light rays entering said incident structures are reflected by said reflecting light surfaces of said incident structures, extension lines of the portion of the light rays intersecting with the first focal region.

6. The vehicle light apparatus as claimed in claim 5, wherein another portion of the light rays entering said incident structures are refracted by said incident surfaces of said incident structures and are not reflected by said reflecting light surfaces of said incident structures, extension lines of the another portion of the light rays intersecting with the first focal region.

7. The vehicle light apparatus as claimed in claim 5, wherein:

said incident structures are circular ring structures and are concentric about a central axis that extends in the top-bottom direction; and said light-exiting portion of said light-exiting lens has a light-exiting surface that intersects with a section plane overlapping the central axis and extending in the front-rear direction along an extension curve.

8. The vehicle light apparatus as claimed in claim 7, wherein said extension curve extends curvedly and rearwardly from a top end to a bottom end thereof.

9. The vehicle light apparatus as claimed in claim 7, wherein said light-exiting lens is icicle shaped.

10. The vehicle light apparatus as claimed in claim 1, wherein said light-exiting portion of said light-exiting lens has a light-exiting surface that is a continuous curved surface.

* * * * *